(12) United States Patent
Leonhard et al.

(10) Patent No.: US 9,582,040 B2
(45) Date of Patent: *Feb. 28, 2017

(54) TOUCH SCREEN PROTECTOR

(75) Inventors: Michael Leonhard, Santa Clara, CA (US); Jonathan Lin, Mountain View, CA (US); Steven Huang, Taipei (TW)

(73) Assignee: AEVOE CORP., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,372

(22) Filed: Mar. 2, 2012

(65) Prior Publication Data
US 2012/0183712 A1    Jul. 19, 2012

Related U.S. Application Data

(63) Continuation of application No. 13/352,196, filed on Jan. 17, 2012, which is a continuation-in-part of
(Continued)

(51) Int. Cl.
*B32B 7/06* (2006.01)
*B32B 37/14* (2006.01)
(Continued)

(52) U.S. Cl.
CPC ............ *G06F 1/1637* (2013.01); *G06F 3/041* (2013.01); *G06F 2200/1633* (2013.01);
(Continued)

(58) Field of Classification Search
CPC ................ G06F 1/1637; G06F 3/041; G06F 2200/1633; G06F 2200/1634;
(Continued)

(56) References Cited

U.S. PATENT DOCUMENTS

| 3,948,662 A | 4/1976 | Alston, Jr. et al. |
| 3,950,580 A | 4/1976 | Boudet |

(Continued)

FOREIGN PATENT DOCUMENTS

| CN | 1522024 | 8/2004 |
| CN | 201203726 | 3/2009 |

(Continued)

OTHER PUBLICATIONS

English translation of JP 2002-328613 (Nov. 2002).*
(Continued)

*Primary Examiner* — Patricia L Nordmeyer
(74) *Attorney, Agent, or Firm* — Polsinelli PC

(57) ABSTRACT

The invention relates to a method for protecting a touch screen of a hand held electronic device having a front face that includes a touch screen portion and a non-functional band. The method of the invention comprises providing a touch screen protector comprising a film having front and back sides, an outer perimeter that corresponds to that of the device, and a transparent window; and an exposed adhesive along the outer perimeter of the film surrounding the transparent window; and removably attaching the protector upon the outer perimeter of the front face of the device via the exposed adhesive to form an enclosed air space between the transparent window of the film, the adhesive and the touch screen portion of the device.

21 Claims, 2 Drawing Sheets

US 9,582,040 B2

Page 2

Related U.S. Application Data application No. PCT/US2011/051344, filed on Sep. 13, 2011, which is a continuation of application No. 13/160,404, filed on Jun. 14, 2011, now Pat. No. 8,044,942, which is a continuation of application No. PCT/US2012/021513, filed on Jan. 17, 2012.

(60) Provisional application No. 61/433,789, filed on Jan. 18, 2011.

(51) Int. Cl.
    B32B 37/12      (2006.01)
    G06F 1/16       (2006.01)
    G06F 3/041      (2006.01)

(52) U.S. Cl.
    CPC ..... G06F 2200/1634 (2013.01); Y10T 428/14 (2015.01); Y10T 428/1471 (2015.01); Y10T 428/2495 (2015.01); Y10T 428/24273 (2015.01); Y10T 428/24322 (2015.01); Y10T 428/24777 (2015.01); Y10T 428/24942 (2015.01)

(58) Field of Classification Search
    CPC ........... Y10T 428/24273; Y10T 428/14; Y10T 428/2495; Y10T 428/24942; Y10T 428/24777; Y10T 428/1471; Y10T 428/24322
    See application file for complete search history.

(56) References Cited

U.S. PATENT DOCUMENTS

| | | | | |
|---|---|---|---|---|
| 4,889,754 | A | 12/1989 | Vargas | |
| 4,907,090 | A | 3/1990 | Ananian | 358/247 |
| 5,132,588 | A | 7/1992 | Warman | 313/479 |
| 5,160,315 | A | 11/1992 | Heinecke et al. | |
| 5,486,883 | A | 1/1996 | Candido | 353/120 |
| 5,668,612 | A | 9/1997 | Hung | 348/818 |
| 6,250,765 | B1 | 6/2001 | Murakami | 359/609 |
| 6,469,752 | B1 | 10/2002 | Ishikawa et al. | 348/834 |
| 6,536,589 | B2 | 3/2003 | Chang | 206/320 |
| 6,555,235 | B1 | 4/2003 | Aufderheide et al. | 428/447 |
| 6,559,902 | B1 | 5/2003 | Kusuda et al. | |
| 6,592,950 | B1 | 7/2003 | Toshima et al. | 428/1.1 |
| 6,614,423 | B1 | 9/2003 | Wong et al. | 345/173 |
| 6,667,738 | B2 | 12/2003 | Murphy | 345/173 |
| 6,721,019 | B2 | 4/2004 | Kono et al. | 349/12 |
| 6,750,922 | B1 | 6/2004 | Benning | 348/818 |
| 6,777,055 | B2 | 8/2004 | Janssen et al. | |
| 6,800,378 | B2 | 10/2004 | Hawa et al. | |
| 6,864,882 | B2 | 3/2005 | Newton | 345/173 |
| 6,879,319 | B2 | 4/2005 | Cok | 345/173 |
| 6,995,976 | B2 | 2/2006 | Richardson | 361/681 |
| 7,034,877 | B2 | 4/2006 | Schmidt | 348/333.01 |
| 7,070,837 | B2* | 7/2006 | Ross | 428/1.1 |
| 7,226,176 | B1 | 6/2007 | Huang | 359/609 |
| 7,495,895 | B2 | 2/2009 | Carnevali | 361/681 |
| 8,044,942 | B1 | 10/2011 | Leonhard et al. | 345/173 |
| 8,974,620 | B2 | 3/2015 | Wilson | |
| 2002/0101411 | A1 | 8/2002 | Chang | 345/179 |
| 2002/0114934 | A1* | 8/2002 | Liu et al. | 428/212 |
| 2002/0122925 | A1 | 9/2002 | Liu et al. | 428/212 |
| 2002/0154099 | A1 | 10/2002 | Oh | 345/173 |
| 2002/0195910 | A1 | 12/2002 | Hus et al. | 312/223.2 |
| 2003/0012936 | A1 | 1/2003 | Draheim et al. | 428/216 |
| 2003/0087054 | A1 | 5/2003 | Janssen et al. | |
| 2003/0110613 | A1* | 6/2003 | Ross | 29/592 |
| 2004/0004605 | A1 | 1/2004 | David | |
| 2004/0109096 | A1 | 6/2004 | Anderson et al. | 348/832 |
| 2004/0209007 | A1 | 10/2004 | Satake et al. | |
| 2004/0227722 | A1 | 11/2004 | Friberg et al. | 345/156 |
| 2004/0246386 | A1 | 12/2004 | Thomas et al. | 348/818 |
| 2006/0114245 | A1 | 6/2006 | Masters et al. | 345/175 |
| 2007/0181456 | A1 | 8/2007 | Kusuda et al. | |
| 2007/0212508 | A1* | 9/2007 | Mase | 428/40.1 |
| 2008/0030631 | A1 | 2/2008 | Gallagher | 348/818 |
| 2008/0055258 | A1 | 3/2008 | Sauers | 345/173 |
| 2008/0062147 | A1 | 3/2008 | Hotelling et al. | 345/174 |
| 2008/0302456 | A1 | 12/2008 | Cook | 150/154 |
| 2010/0026646 | A1 | 2/2010 | Xiao et al. | 345/173 |
| 2010/0092713 | A1 | 4/2010 | Bullard et al. | 428/40.1 |
| 2010/0102197 | A1 | 4/2010 | McIntyre | 248/287 |
| 2010/0164836 | A1 | 7/2010 | Liberatore | 345/1.1 |
| 2010/0208352 | A1* | 8/2010 | Onozawa et al. | 359/599 |
| 2010/0238119 | A1 | 9/2010 | Dubrovsky et al. | 345/169 |
| 2010/0245273 | A1 | 9/2010 | Hwang et al. | 345/173 |
| 2010/0270189 | A1* | 10/2010 | Pedersen et al. | 206/320 |
| 2011/0157056 | A1 | 6/2011 | Karpfinger | 345/173 |
| 2011/0279383 | A1* | 11/2011 | Wilson et al. | 345/173 |
| 2011/0285932 | A1 | 11/2011 | Park | 349/56 |
| 2013/0045371 | A1 | 2/2013 | O'Donnell | |
| 2013/0209718 | A1 | 8/2013 | Wen | |

FOREIGN PATENT DOCUMENTS

| | | |
|---|---|---|
| CN | 201397689 | 2/2010 |
| DE | 198 08 535 A1 | 9/1999 |
| EP | 1471415 A2 | 10/2004 |
| EP | 1548691 A1 | 6/2005 |
| GB | 2 449 899 A | 12/2008 |
| JP | 2002328613 | 11/2002 |
| TW | 200700793 | 1/2007 |
| TW | M343359 U | 10/2008 |
| TW | 201027992 | 7/2010 |
| TW | M386524 U | 8/2010 |
| TW | M400596 U | 3/2011 |
| WO | WO 03/052678 A1 | 6/2003 |

OTHER PUBLICATIONS

*Aevoe v. Splash*, USDC NDCA, Case No. 4:11-cv-06165-CW (the court order dismissing case) Mar. 23, 2012.

*Aevoe Corp. v. Shenzhen Membrane Precise Electron Ltd.*, MJ, USDC NV, Case No. 2:12-cv-00054 (the court order dismissing case with prejudice) dated Sep. 17, 2012.

*Aevoe v. PhoneDevil Ltd.*, USDC NV, Case No. 2:12-cv-00514 (the permanent injunction order) Jun. 25, 2012.

*Aevoe v. AE Tech Co., Ltd.*, MJ; USDC NV, Case No. 2:12-cv-00053 (the temporary restraining order, seizure, and order to show cause re: preliminary injunction) Jan. 12, 2012.

*Aevoe v. AE Tech Co., Ltd.*, MJ; USDC NV, Case No. 2:12-cv-00053 (the preliminary injunction order) Jan. 24, 2012.

*Aevoe v. AE Tech Co., Ltd.*, MJ; USDC NV, Case No. 2:12-cv-00053 (the order confirming and modifying the preliminary injunction) Mar. 7, 2012.

Request for Inter Partes Reexamination, Control No. 95/002,073, submitted on Aug. 14, 2012.

Decision on Petition Under 37 CFR 1.181 & 1.927 on Inter Partes Reexamination, Control No. 95/001,881. Jun. 29, 2012.

MyMacworld: iVisor AG anti-reflective screen protector review, Dec. 17, 2009 www.mymac.com/2009/12/ivisor-ag-anti-reflective-screen-protector-review/.

The Ultimate MacBook Pro Protection Suite by Moshi, Jul. 7, 2009 gigaom.com/apple/the-ultimate-macbook-pro-protection-suite-by-moshi/.

Moshi iVisor Pro 13 (anti-glare), Jan. 29, 2012 store.moshimonde.com/ivisor-pro- 13 html.

Office communication dated Apr. 20, 2012 for Reexamination Application Control No. 95/001,881.

Response filed by the patentee on Apr. 27, 2012 for Reexamination Application Control No. 95/001,881.

Taiwan Search Report, TW100133098, mailed Apr. 9, 2012.

European Search Report, Appln. No. EP12171588, dated Oct. 2, 2012.

Patent Owner Response After Action Closing Prosecution filed on Jul. 3, 2013 for Reexamination Application Control No. 95/002,073

Action Closing Prosecution dated May 3, 2013 for Reexamination Application Control No. 95/002,073.

(56) References Cited

OTHER PUBLICATIONS

Revised Third Party Requestor's Comments on the Patent Owner Response filed on Mar. 25, 2013 for Reexamination Application Control No. 95/002,073.
Third Party Requester's Response to Notice of Failure to Comply With Inter Partes Reexamination Filing Requirements by the Requester filed on Mar. 25, 2013 for Reexamination Application Control No. 95/002,073.
*Aevoe Corp.* v. *AE Tech Co. Ltd.*, USDC NV, Case No. 2:12-cv-00053-GMN-RJJ (Order construing the disputed claim terms) May 14, 2013.
Office communication dated Oct. 2, 2012 for Reexamination Application Control No. 95/002,073.
Response to the Inter Parte Re-Examination Request filed by the patentee on Nov. 18, 2012 for Reexamination Application Control No. 95/002,073.
Third Party Requestor's Comments on the Patent Owner Response filed on Dec. 18, 2012 for Reexamination Application Control No. 95/002,073.
Non-Final Office Action dated Jan. 16, 2014 for related U.S. Appl. No. 14/078,245, filed Nov. 12, 2013.
Office Action issued Jun. 25, 2014 in U.S. Appl. No. 12/780,443.
IPR2016-00231—Power of Attorney, filed Nov. 23, 2015.
IPR2016-00231—Petition for Inter Partes Review, filed Nov. 23, 2015.
IPR2016-00231—Notice of Filing Date Accorded to Petition and Time for Filing Patent Owner Preliminary Response, filed Nov. 30, 2015.
IPR2016-00231—Patent Owner's Mandatory Notice, filed Dec. 14, 2015.
IPR2016-00231—Patent Owner's Preliminary Response, filed Feb. 29, 2016.
IPR2016-00231—Decision, Denying Institution of Inter Partes Review, issued May 18, 2016.
IPR2016-00231—Patent Owner's Updated Mandatory Notice, filed May 18, 2016.
IPR2016-00231—Petitioner's Request for Rehearing, filed Jun. 15, 2016.
IPR2016-00231—Exhibit 1002—Patent Prosecution History, filed Nov. 23, 2015.
IPR2016-00231—Exhibit 1005—"Moshi ivisor Anti-Refelctive Screen Protector for Macbook 15-inch Unibody", "Amazon.com: Moshi ivisor Anti-Reflective Screen Protector for Macbook 15-inch UnibodyElectronics", filed Nov. 23, 2015.
IPR2016-00231—Exhibit 1011—Aevoe Appeal Brief, U.S. Appl. No. 14/078,245, filed Nov. 23, 2015.
IPR2016-00231—Exhibit 1015—Examiner's Answer to Appeal Brief and Final Rejection, U.S. Appl. No. 14/078,245, filed Nov. 23, 2015.
IPR2016-00231—Exhibit 1016—Inter Partes Reexamination Certificate, Reexamination No. 95/002,073, filed Nov. 23, 2015.
IPR2016-00231—Exhibit 1017—Notice of Acceptance of Power of Attorney, Reexamination No. 95/001,881, filed Nov. 23, 2015.
IPR2016-00231—Exhibit 1018—Declaration of Dr. Mark Ross, filed Nov. 23, 2015.
IPR2016-00231—Exhibit 1019—Declaration of Vivek Ganti, filed Nov. 23, 2015.
IPR2016-00231—Exhibit 2001—Joint Claim Construction and Prehearing Statement; Case No. 2:15-cv-00149-RFB-CWH, filed Feb. 29, 2016.
IPR2016-00231—Exhibit 2002—Opening Claim Construction Brief; Case No. 2:15-cv-00149-RFB-CWH, filed Feb. 29, 2016.
IPR2016-00231—Exhibit 2003—Order; Case No. 2:15-cv-00149-RFB-CWH, filed Feb. 29, 2016.
IPR2016-00231—Exhibit 2004—Patent Prosecution History, U.S. Appl. No. 13/352,196, filed Feb. 29, 2016.
IPR2016-00231—Exhibit 2005—Patent Prosecution History, U.S. Appl. No. 13/411,372, filed Feb. 29, 2016.
IPR2016-00231—Exhibit 2006—Patent Prosecution History, U.S. Appl. No. 14/078,245, filed Feb. 29, 2016.
IPR2016-00231—Exhibit 2007—Patent Prosecution History, U.S. Appl. No. 13/838,311, filed Feb. 29, 2016.
IPR2016-00231—Exhibit 2008—Touch Technology Brief, "Technology Comparison: Resistive and Surface Capacitive"; 3M and MicroTouch System, filed Feb. 29, 2016.
IPR2016-00231—Exhibit 2010—Raymond A. Serway and John W. Jewett, Jr.; Physics for Scientists and Engineers with Modern Physics, Cengage Learning, Boston, MA; pp. 1144-1145, 2-9, filed Feb. 29, 2016.
IPR2016-00231—Exhibit 2011—"Selling at Amazon.com", Editing Product Pages; http://amazon.com/gp/help/customer/display.html?nodeld=200202090, filed Feb. 29, 2016.
IPR2016-00231—Decision, Denying Petitioner's Request for Rehearing, issued Jul. 25, 2016.
IPR2016-00231—Exhibit 1009—Michael Leonhard, "Email Correspondence", Aevoe IB00006229, filed Nov. 23, 2015.
IPR2016-00231—Exhibit 1010—Michael Leonhard, "Email Correspondence", Aevoe IB00006258, filed Nov. 23, 2015.
IPR2016-00231—Exhibit 1004—Masaaki Kitaguchi, Cover Sheet for Display Screen (Hyoji Gamen Yo Kabaa Shiito), pp. 17, Application No. 2001131384; Publication Country Japan, filed Nov. 23, 2015.
Written Opinion of the International Preliminary Examining Authority dated Jul. 3, 2012, International Application No. PCT/US2011/051344.
Alvaro Serrano, Review: Moshi iVisor AG—a matte screen protector for the 13" MacBookPro, Analog Senses, Jul. 3, 2010; available at http://analogsenses.com/2010/07/031765525210/.
Amazon.com Ad, moshi iVisor AG 13, Anti-Glare Screen Protector for Macbook 13" Unibody; available at http://www.amazon.com/iVisor-Anti-Glare-Protector-Macbook-Unibody/dp/B0029TSTT4/ref=cm_cr_pr_product_top.
Amazon.com Ad, Moshi Accessories Kit for Apple iPad 2 2nd Generation Tablet (16GB, 32GB, 64GB, Wifi, AT&T 3G, Verizon 3G,) Newest Model Includes iVisor AG (Anti Glare) Screen Protector for iPad 2—White (99M0020909) + TeraGlove Microfiber Screen Cleaner; available at http://www.amazon.com/Accessories-Generation-Verizon-Includes-Protector/dp/B005GXLGOK/ref=sr_1_21?ie=UTF8&qid=1340863169&sr=8-21&keywords=ivsor+AG.
Amazon.com Ad, 2 Pack Moshi iVisor AG Anti-Glare Screen Protector for Apple iPhone 4 & iPhone 4S (White) + MicroFiber Cleaning Cloth; available at http://www.amazon.com/Moshi-Anti-Glare-Protector-MicroFiber-Cleaning/dp/B0063GAH9Y.
Jake Gaecke, "Appletell reviews the iVisor AG for iPad" appletell.com, Sep. 15, 2010 at 12:32 PM http://www.appletell.com/apple/comment/appletell-reviews-ivisor-ag-for-ipad/.
"What Makes NuShield Screen Protectors Superior" nushield.com http://www.nushield.com/technology.php.
"SGP iPhone 4 Screen and Body Protector Set Incredible Shield Series" sgpstore.com http://www.sgpstore.com/cell-phone/apple-iphone/iphone-4/sgp-iphone-4-screen-body-protector-set-incredible-shield-series.html.
"Invisible Shield" zagg.com http://www.zagg.com/invisibleshield/apple-ipad-2-3g-cases-screen-protectorscovers-skins-shields-1.php.
"Sony PCKLM1AM Semi-Hard Plastic LCD Screen Cover Protector for NEX-3, NEX-5, SLT-A33, and SLT-A55 Alpha Camera Models" amazon.com http://www.amazon.com/Sony-PCKLM1AM-Semi-Hard-Plastic-Protector/dp/B003XFGIKA.
"GGS Optical Glass LCD Screen Protector 3.0" for Sony Cybershot DSC HX1 H10 H20 W230 W290 N1 N2 T100 amazon.com http://www.amazon.com/Optical-Glass-Screen-Protector-Cybershot/dp/B003ZEXG68.
"Giottos SP8270 Aegis Multi-coated LCD Screen Protector" amazon.com http://www.amazon.com/Giottos-SP8270-Multi-coated-Screen-Protector/dp/B001940LR8.
"Invisible Gadget Guard, the original" gadgetguard.com http://www.gadgetguard.com/guard.
"Protect your iPhone 4 with Screen Protectors from Incipio®" incipiotech.com, Jul. 22, 2010 http://incipiotech.com/tag/screen-protectors.
http://store.moshimonde.com/ivisor-ag-ipad.html, Jul. 2010.
http://store.moshimonde.com/ivisor-xt-ipad.html, Aug. 2010.

(56) References Cited

OTHER PUBLICATIONS http://store.moshimonde.com/ivisorag-for-ipad2-black.html, Mar. 2011.
http://store.moshimonde.com/ivisorag-for-ipad2-white.html, Mar. 2011.
http://store.moshimonde.com/ivisor-ag-iphone4-black.html, Nov. 2010.
http://store.moshimonde.com/ivisor-ag-iphone4-white.html, May 2010.
Amendment for U.S. Appl. No. 10/436,594, publication No. 2004/0227722.
"Moshi-Zubehor der Extraklasse ( i nk 1 iVisor AG)",Internet,Jul. 23, 2010 (Jul. 23, 2010), XP55013277, URL:http://www.rosenblut.org/2010/07/23/moshi-zubehor-der-extraklasse-inkl-ivisor-ag.
"iVisor Matte iPad Protector with a Bubble Free Guarantee", Dec. 16, 2010 (Dec. 16, 2010), XP55013271, URL:http://www.youtube.com/watch?v=LYnRXZALIVY.
International Search Report and Written Opinion PCT/US2011/051344, mailed Aug. 12, 2011.
Petition for Inter Partes Review of U.S. Pat. No. 8,044,942; Filed Nov. 23, 2015.
Exhibit 1080;Declartion of Dr. Mark Ross; U.S. Pat. No. 8,044,942.
Exhibit 1005 iVisor for MacBook ("iVisor").
Notice of Filing Date Accorded to Petition and Time for Filing Patent Owner Preliminary Response; Mailed Nov. 30, 2015.

\* cited by examiner

TOUCH SCREEN PROTECTOR

CROSS-REFERENCE TO RELATED APPLICATIONS

This application is a continuation of application Ser. No. 13/352,196 filed Jan. 17, 2012, which is a continuation-in-part of International application PCT/US2011/051344 filed Sep. 13, 2011, which is a continuation of application Ser. No. 13/160,404 filed Jun. 14, 2011, now U.S. Pat. No. 8,044,942, and which claims the benefit of provisional application 61/433,789 filed Jan. 18, 2011. This application is also a continuation of International application no. PCT/US2012/021513 filed Jan. 17, 2012, which is a continuation-in-part of International application PCT/US2011/051344 filed Sep. 13, 2011, which is a continuation of application Ser. No. 13/160,404 filed Jun. 14, 2011, now U.S. Pat. No. 8,044,942, and which claims the benefit of provisional application 61/433,789 filed Jan. 18, 2011. The entire content of each prior filed application is expressly incorporated herein by reference thereto.

FIELD OF THE INVENTION

The invention relates to a touch screen protector. In particular, it relates to a touch screen protector that can be easily attached and removed from a hand held electronic device that includes and is operable by a touch screen, and a method use thereof.

BACKGROUND OF THE INVENTION

With the ever increasing popularity of the touch screen hand held electronic devices came the demand for effective touch screen protectors. While the beautiful and glossy screen of touch screen hand held electronic devices such as iPad device looks great, in actual use, the amount of fingerprints left behind significantly damages the appearance and display quality of the screen. For this reason, the device is sold with a screen cleaning cloth. As frequent cleaning is not desirable, various screen protecting devices have been suggested.

Several kinds of touch screen protector are currently available. The ZAGG INVISIBLESHIELD™ product is a glare reduction touch screen protector. Its major drawback is the difficulty to apply the protector to a hand held device. The anti-glare INCIPIO™ screen protector of traps dust particles and bubbles even after meticulous cleaning and application. Other touch screen protectors currently available in the market are also unsatisfactory to the consumers, as a result of their tendency to trap air bubbles and dust, even with careful application. When in use, these touch screen protectors are in direct physical contact with the touch screen of the electronic device, either by static or application of adhesives. In the latter scenario, when the screen protectors are removed, diligent cleaning is needed to restore the touch screen to its shining luster. JP 2002328613 relates to a cover sheet comprising a transparent plastic film to protect a display screen, said cover sheet having a spacer comprising countless dots on a surface opposite the aforesaid display screen. U.S. Pat. No. 7,070,837 relates to a plastic film screen protector having a slightly roughened surface so that the majority of the film facing an electronic device screen does not substantially touch the screen. As a result, the roughened surface of the protector prevents interference patterns from arising when the film touches the screen.

None of these prior art devices has been found to be completely suitable, such that there is a need in the industry for a touch screen protector that is able to be installed easily and quickly without problems of trapping air bubbles or dust. The touch screen protector of the present invention now satisfies this need.

SUMMARY OF THE INVENTION

The invention relates to a method for protecting a touch screen of a hand held electronic device having a front face that includes a touch screen portion and a non-functional outer perimeter. In one embodiment, the method of the invention comprises providing a touch screen protector comprising a film having front and back sides, an outer perimeter that essentially corresponds to the non-functional outer perimeter of the front face, and a transparent window that essentially corresponds in size to that of the touch screen portion; and an exposed adhesive along the outer perimeter of the film surrounding the transparent window; and removably attaching the touch screen protector upon the outer perimeter of the front face of the device via the exposed adhesive to form an enclosed air space between the transparent window of the film, the adhesive and the touch screen portion of the device, wherein the touch screen is attached without causing bubble formation between the transparent window of the film and the touch screen portion of the device. The transparent window can be pressed against the touch screen portion of the device for operation of the device while preventing direct contact of a user's fingers with the touch screen portion of the device and without producing visible interference patterns during use. Preferably, the film is a plastic film.

In one embodiment, the exposed adhesive has sufficient adhesiveness to mount the touch screen protector onto the device but to enable its removal without leaving adhesive residue on the device.

In one embodiment, the film has a thickness of between 0.5 and 2 mm and includes an opaque band about its periphery that receives the adhesive.

Advantageously, the film includes micro-particles present on the back side of the film at a density which is sufficiently high to provide an anti-static effect without adversely affecting quality of images viewed through the window. Preferably, micro-particles are also present on the front side of the window in an amount effective for providing anti-glare and anti-static effects to the window.

In a preferred embodiment, the front face of the hand held electronic device has a non-functional band about its perimeter and the width of the adhesive is selected to conform to or be within the band so that the adhesive does not interfere with the use of the touch screen when the touch screen protector is adhesively mounted onto the device.

In one embodiment, the method of the invention further comprises providing a backing member to protect the back side of the film and the exposed adhesive prior to use. Preferably, the backing member further includes a tab to assist in the removal of the backing member when mounting the touch screen protector on the device.

In one embodiment of the invention, the method further comprises providing one or more alignment holes that match one or more buttons on the electronic device to facilitate mounting of the touch screen protector on the device.

In one preferred embodiment, the touch screen of the device and the film are each substantially rectangular and the touch screen is part of a telephone, reading device, music device, viewing device or navigation device.

In one embodiment, the transparent window is clear but includes a coating that provides a matte effect or a privacy screen feature.

The invention also relates to an improvement in a hand held, touch screen electronic device having a front face that includes a touch screen portion and an outer perimeter that is non-functional, which comprises providing a touch screen protector for the device, the touch screen protector comprising a film having front and back sides, an outer perimeter that essentially corresponds to the non-functional perimeter of the front face, and a transparent window that essentially corresponds in size to the touch screen portion; and an exposed adhesive along the outer perimeter of the film that essentially covers the non-functional outer perimeter of the front face and that surrounds the transparent window so that the touch screen protector can be removably mounted upon the outer perimeter of the front face of the device via the exposed adhesive to form an enclosed air space between the transparent window of the film, the adhesive and the touch screen portion of the device, without causing bubble formation between the transparent window of the film and the touch screen portion of the device, and further so that the transparent window can be pressed against the touch screen portion of the device for operation of the device while preventing direct contact of a user's fingers with the touch screen portion of the device and without producing visible interference patterns during use. Preferably, the film is a plastic film.

DETAILED DESCRIPTION OF THE INVENTION

Figure 1A:
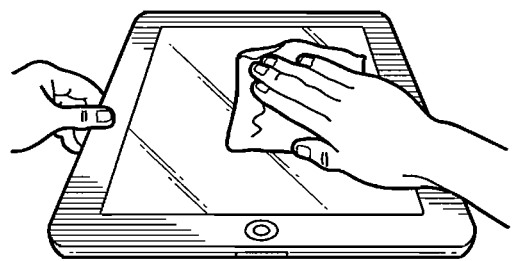
FIGS. 1A-D are schematic diagrams of assembling a touch screen protector of the invention with an iPad device.

The following definitions are used in this disclosure:

The term "near" as used herein means close in distance but not in physical contact, preferably about or less than 1 mm apart.

The term "periphery" as used herein means the outermost part or region within a precise boundary.

The term "non-functional band" as used herein means the area of the front face that surrounding the touch screen portion of the hand held electronic device which is made of a different material or made of the same material as the touch screen portion but is not touch sensitive.

The term "front face" of the device refers to the exposed screen surface of the device. The touch screen is generally made of a single glass sheet that includes the exposed surface for both the operable touch screen portion and the non-functional band around the perimeter of the touch screen portion.

The term "matte" as used herein means a surface finish which reflects back only a small portion of the incident light shined upon it.

The term "anti-static" is used to mean that the film does not generate static electricity when contacted or rubbed by the user.

The invention relates to a novel touch screen protector including a film and an exposed adhesive provided along the outer perimeter of the film. Preferably, the film is a plastic film. Unlike most of the prior art touch screen protectors which are in direct physical contact with the touch screen, the touch screen protector of the present invention does not touch the operable portion of the touch screen. Such portion is referred to herein as the "touch screen portion." This critical feature of the present invention makes it possible for the screen protector to be 100% bubble free.

Although varying from device to device, the distance between the touch screen protector and the touch screen portion of the hand held device is less than the thickness of the film. The spacing can be as small as possible provided that the protector is not in contact with the touch screen portion when the device is not in use. The stiffness of the film contributes to the desired spacing between the protector and the touch screen portion of the device when the device is not in use. However, the film should not be so stiff as to hinder the user's ability to operate the touch screen portion. The preferred dimensions and properties of the film disclosed herein achieve these features. Preferably, the film is a plastic film.

The film has front and back sides, an outer perimeter that corresponds to that of the device, and a transparent window. The light transmission of the transparent window is preferably 60%, more preferably 75%, and most preferably 85%. In one preferred embodiment, the film has a thickness of between about 0.15 and about 2 mm and includes an opaque band about its periphery.

The film is sufficiently hard or stiff so that it does not bend or collapse under its own weight to contact the touch screen portion when the protector is applied onto the handheld device and the device is placed horizontally on a flat surface. Preferably, the hardness of the film is more than 1H, as assayed by Pencil Harness Test. More preferably, the hardness of the film is more than 2H. Most preferably, the hardness of the film is more than 3H. The film is also sufficiently thin to be elastic so that, to operate the touch screen portion, all that is necessary is a gentle force from a user's finger to press any point of the transparent window of the film against the touch screen portion of the hand held device. The film can be made of any suitable transparent material available. Preferably, the film is a plastic film made of polyethylene terephthalate (PET).

The protector achieves the desired spacing without providing irregularities, bumps or other non-uniformities on the back side of the film. The film instead is essentially smooth and utilizes coatings of micro-particles to achieve improved performance compared to the touch screen protectors of the art.

In one embodiment, the film is coated to have a "matte" or anti-glare effect. Surface treatment such as EZ-GLIDE™ surface treatment further allows better touch screen portion maneuverability and effectively reduces finger glide friction on the touch screen portion of the hand held device. Specifically, the EZ-GLIDE™ surface treatment is a technology in which the front side of the screen protector, i.e., the side that contacts the hand, is provided with micro-particles that reduce static effects and allows the hand to move smoothly on the front side of the screen protector.

While prior film products that were to be handled by users may have been considered to require a treatment to reduce electrostatic charges due to rubbing contact, the present invention is at least partly based on the discovery that the provision of an EZ-GLIDE™ micro-particle surface treatment on the back side of the film, i.e., the side of the film facing the touch screen portion, prevents or avoids the generation of interference patterns (or Newton-rings) when the protector is pressed against the touch screen portion by the user's finger or fingers. In addition to this desirable anti-Newton ring effect, the EZ-GLIDE™ micro-particle surface treatment on the back side of the film also prevents or avoids producing static electricity effects between the screen protector and the touch screen portion.

The micro-particles are not in physical contact with the touch screen portion unless the screen protector is pressed against the touch screen portion. As a result of the anti-static effects of the micro-particles, the screen protector will quickly bounce back or pull away from the touch screen portion once it is no longer pressed against it. The micro-particles on the back side of the film can be of various shapes, such as the column shape and the wave shape. The density of micro-particles are optimized such that they are high enough for providing anti-static effects but not too high as to adversely affect the quality of images that are viewed through the transparent window. Preferably, the micro-particles cover more than 5% of the film. More preferably, the micro-particles cover more than 8% of the film. Most preferably, the micro-particles cover more than 10% of the film. If desired, the entire film of the protector can be covered with micro-particles, but good results can also be achieved if only up to 50% of the entire film is covered. The micro-particles can be made of any transparent material commonly known in the art. In one preferred embodiment, the film is a plastic film made of PET, and the micro-particles are also made of PET so that they are compatible with the film material. It is most preferable for the film of the touch screen protector of the present invention to include micro-particles on both sides so that both the front and back surfaces of the film do not generate static electricity during use.

The touch screen of most electronic devices has a non-functional band, which creates a perimeter border. The touch screen protector of the present invention is designed so that the exposed adhesive can adhere to this border such that the transparent window enables the full operative portion of the touch screen portion to be used. The opaque band on the film more or less corresponds to the non-functional band of the front face of the device. This is a useful advantage when manufacturing the product, as a separate pigmenting or coloring step on the film is not needed. To assure that the operative touch screen portion is not hindered, the exposed adhesive has a width that is less than that of the border wherever possible. To do this, the exposed adhesive has a width that is 1 to 2 mm less than that of the opaque band. Thus, when the exposed adhesive is properly applied along the outer perimeter onto the back side of the film, it surrounds the transparent window but does not touch the latter, thus facilitating proper operation of the touch screen portion.

For devices that have non-functional boundaries that are not uniform, e.g., the iPod Touch, the exposed adhesive of the protector can be configured in the same manner. It is also possible, although not preferred, to include the exposed adhesive only upon a portion of the perimeter, such as on top and bottom of a rectangular protector when the side boundaries of the touch screen are very small so that the protector can be mounted on the device without blocking or interfering with the functional touch screen portion of the device.

When the touch screen of the device has a non-functional band about its perimeter, the width of the exposed adhesive is preferably selected to conform to the width of the band so that the exposed adhesive does not interfere with the use of the touch screen portion when the protector is adhesively mounted onto the device. The exposed adhesive makes it possible to removably mount the protector upon the outer perimeter of the touch screen to form an enclosed air space between the transparent window of the film, the adhesive and the touch screen portion of the device. The exposed adhesive has sufficient adhesiveness to mount the protector onto the device but enables its removal without leaving adhesive residue on the device. Preferably, the exposed adhesive has an adhesive strength of 5-50 grams. Various adhesives of this type are commercially available and a skilled artisan can select the particular adhesive for the specific application of the protector to any particular device. An adhesive that allows for repeated cleaning and re-application is preferred so that the screen protector can be washed and reapplied repeatedly. Any commercially available washable and reusable adhesives can be used, such as adhesives made of silicone and polyurethane (PU).

Preferably, the touch screen protector of the invention also comprises a backing member to protect the back side of the film and the exposed adhesive. The backing member may further include a tab to assist in the removal of the backing member when mounting the protector. By grasping and pulling on the tab, the backing member is easily removed from the protector to enable it to be mounted upon the device by contact of the exposed adhesive to the non-functional border of the touch screen of the device.

As many of these types of electronic devices includes one or more operational buttons on the touch screen operative portion or border for performing functions such as on-off switching between internet browsers, photos, music and e-mail, the touch screen protector of the invention may further comprise one or more holes that match the one or more buttons on the electronic device. In addition to exposing the buttons for ease of operation, these holes act as alignment features to facilitate proper mounting of the film on the touch screen.

Although the touch screen protector can be of any shape, they are preferably substantially rectangular to conform to the shape of current handheld devices, and most of those devices have a substantially rectangular shape. In particular, the shape of the protector is not exactly rectangular as the corners are rounded to match those of the devices. Thus, the touch screen protector can be used to protect touch screens of many different kinds of handheld electronic devices, such as a mobile telephone, reading device, music device, viewing device or navigation device. Examples of such devices are iPhone, Nook, iPod, iPad, Droid, and GPS navigation systems. The nature of the protector and its design enable specific embodiments to be adapted to conform to the touch screen of any such device.

The touch screen protector of the present invention has the advantage of being able to be installed easily and quickly, e.g., within 30 seconds or less. Because the installation process is so quick, when properly applied, no dust will be trapped in between the touch screen portion of the hand held electronic device and the touch screen protector. As the touch screen protector of the present invention is to be gently applied to the non-functional border that typically surrounds the touch screen portion of a hand held device, there is no concern for leaving glue traces on the touch screen portion. Thus, the touch screen protector of the invention can be easily and readily removed without any adverse effect on the appearance and display quality of the touch screen portion of the hand held device.

Advantageously, when the hand held device is protected by the touch screen protector of the invention, there are no fingerprint smudges on the touch screen portion, no decrease in the quality of the display, and no decrease in the touch response of the screen. It would even allow the use of a capacitive stylus when using art applications on the hand held device.

In addition, the touch screen protector of the present invention also reduces the glare of a glossy touch screen portion. As a result, the photos on the touch screen portion look like prints. There is virtually no effect on the crispness of the touch screen portion even though the glare is completely removed. Owing to the absolute finger print resistance feature of the touch screen protector of the present invention, it completely resolves the issue of smudge of the touch screen portion.

The invention provides a method of protecting a hand held, touch screen electronic device by using the touch screen protector of the invention. Moreover, the invention provides an improvement in a hand held, touch screen electronic device by providing the touch screen protector of the invention for protection of the touch screen of the device.

EXAMPLES

Example 1

Protecting an iPad

Figure 1B:
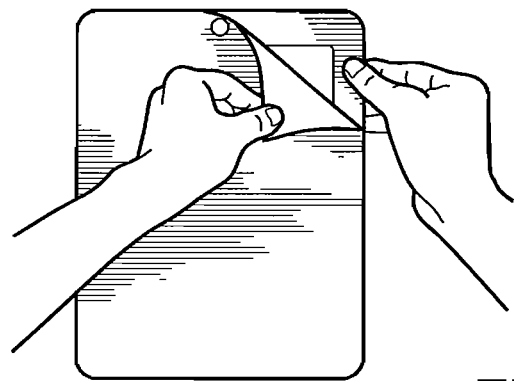
Figure 1C:
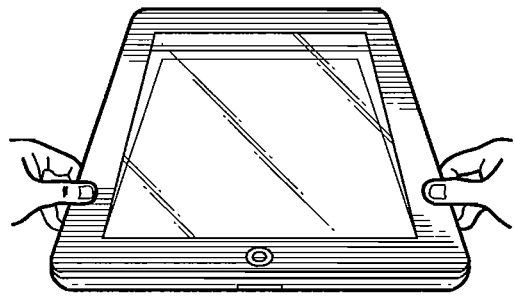
Figure 1D:
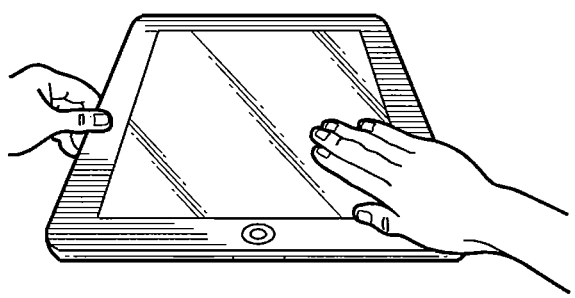

The touch screen protector of the invention may be made for use with Apple's iPad as an anti-reflective screen protector specifically designed to protect iPad's touch screen while reducing fingerprint smudging. The protector can be installed in seconds without any air bubbles, unlike other screen protectors that require tedious installation procedures and often result in unwanted air bubbles or hinder touch screen performance. As shown in the schematic diagrams of FIGS. 1A-D, the installation procedure is as follows. First, the screen of the iPad is cleaned by using the microfiber cloth included in the package to wipe away any dust particles on the iPad screen (FIG. 1A). Second, the backing member is peeled off gently before applying the plastic film to the non-functional boundary of the iPad screen (FIG. 1B). Third, the protector is aligned starting at the bottom, with the circular opening of the protector placed over iPad's "home" button (FIG. 1C). Finally, gentle pressure is applied around the borders of the protector so that it is secured in place on the iPad (FIG. 1D).

Figure 2:
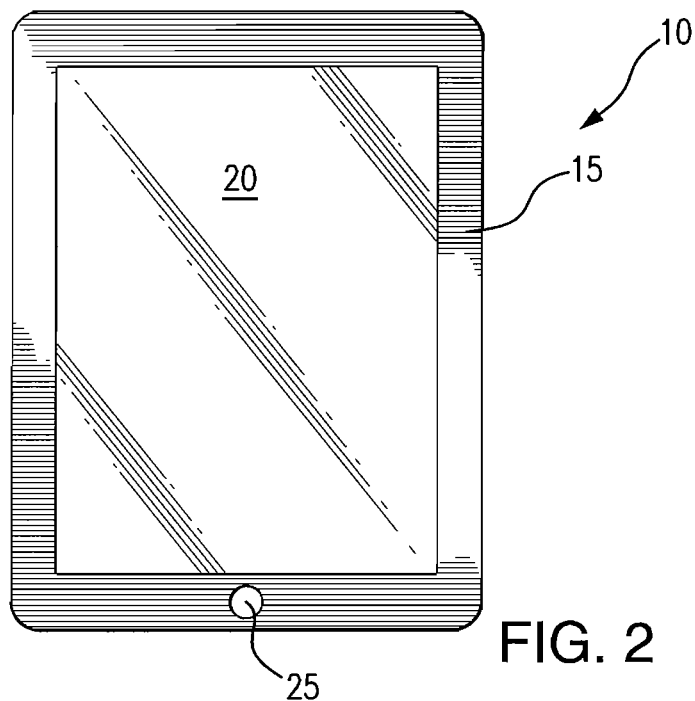
FIG. 2 is a front view of the touch screen protector of FIG. 1.
Figure 3:
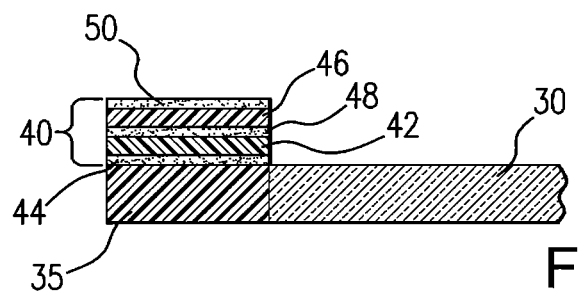
FIG. 3 is an expanded partial sectional view of the touch screen protector of FIG. 2 to illustrate the spacer.
Figure 4:
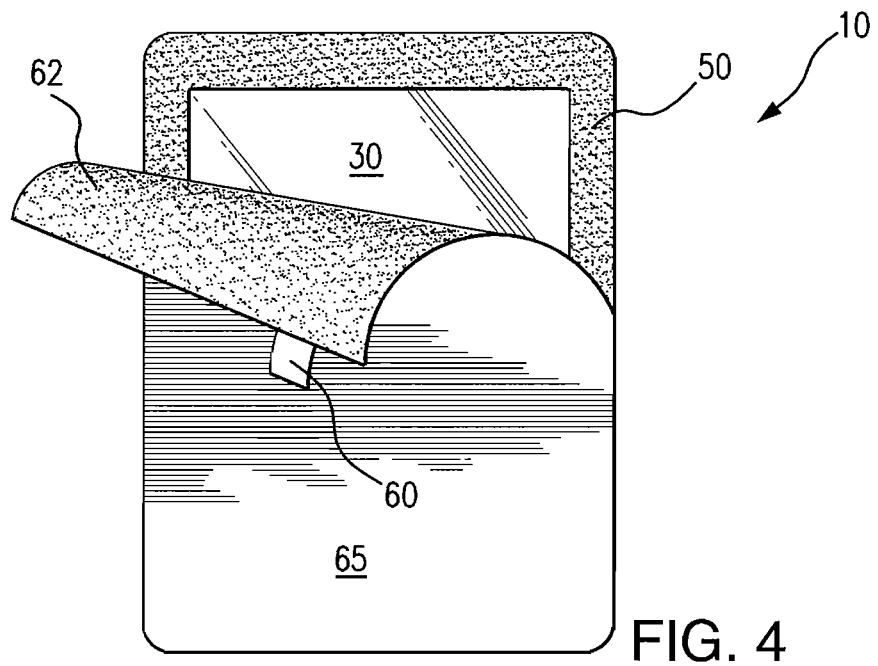
FIG. 4 is a back view of the touch screen protector with a portion of the backing member removed.

Further details of the protector and its construction are shown in FIGS. 2 to 4. As shown in FIG. 2, the protector 10 is generally rectangular and has an opaque band 15 around its perimeter. The band essentially conforms to the non-functional band that surrounds the touch screen of the iPad, while the transparent window 20 corresponds to the functional portion of the touch screen of the iPad. The protector includes a hole 25 that corresponds to the on-off selector button of the iPad. The spacer is on the back side of the plastic film and is not visible due to the presence of the opaque band.

FIG. 3 is an expanded cross-sectional view of the spacer. The plastic film is shown as 30 with the opaque band shown as 35. The spacer is shown as 40 and it includes the first strip 42 adhered to the plastic film 30 by adhesive 44, and the second strip 46 adhered to the first strip 42 by adhesive 48. The exposed adhesive 50 is shown on the spacer.

FIG. 4 is a view of the back side of the protector 10 as the backing member 65 is being removed for application of the protector to the iPad. As shown, tab member 60 has been pulled to detach backing member 65 from spacer 50, thus showing the inside surface 62 of the backing member and the back side of the plastic film 30 behind the transparent window as well as the exposed adhesive 50 of the spacer. The backing member 65 is completely removed before the protector 10 is applied to the iPad.

As the screen protector does not touch the touch screen portion of the iPad, it can be easily removed without leaving any residue on the touch screen portion. The adhesive also does not leave any residue on the non-functional border due to its relatively low adhesivity. The touch screen protector provide excellent touch screen portion maneuverability and scratch/smudge resistance while retaining optimal touch screen portion sensitivity and feedback.

Example 2

Protecting an iPhone 4

Another protector can be specifically adapted for Apple's iPhone 4 touch screen. The protector is sized to conform to the touch screen and is applied in a similar manner as for the iPad. First, the iPhone 4 is cleaned by using the microfiber cloth included in the package to wipe away any dust particles on the iPhone 4's screen. Second, the protector's backing member is peeled off gently before applying the plastic film to the boundaries of the iPhone touch screen. Third, the protector is properly aligned on top of the iPhone touch screen. Finally, pressure is gently applied around the borders of the protector to secure it in place. Again, the touch screen protector provides excellent touch screen portion maneuverability and scratch/smudge resistance while retaining optimal touch screen portion sensitivity and feedback.

Example 3

Plastic Films for the Touch Screen Protectors

The plastic films are made with the following specifications:

| | |
|---|---|
| Structure | HC (Matt) --- PET (188 μm) --- HC (Matt) |
| Total light transmittal | ≥89.0% |
| Haze | 10.5 ± 2.0% |
| Pencil Hardness | ≥3H |
| Steel wool abrasion test | No scratches |
| Adhesion | 0% Peel |
| Wetting tension test | ≥33 mN/m |
| Foreign matter contaminations | Diameter < 0.2 mm (ignored) |
| | Diameter ≥ 0.2 mm (≤0.5/m$^2$) |
| Scratch | None (W ≥ 0.1 mm & L ≥ 1.5 mm) |

To ensure the quality of the film, several tests such as cross cut tape test are carried out as follows:

First, cut the surface of the film with utility knife horizontally and vertically for 11 lines each to make one hundred 1 mm×1 mm squares on the film. Then, apply more than 20 mm long Nichiban Celofan Tape (Nichiban No. 405) on the cut surface and press with finger. Afterwards, pick up the tape end and remove the tape to 60° angle/0.5-1 mm to see if any coating comes off.

In both Examples 1 and 2, the protector can be removed for cleaning and re-application as necessary. The protector can be cleaned by rinsing with water and air drying. Small amounts of dishwashing detergent can be applied if necessary. Any debris or dust caught on the transparent window of the touch screen protector can be first brushed away. Once done rinsing, the protector is placed, adhesive side up, onto a towel and allowed to air dry. After it is completely dry and clean, it can be reapplied to the device.

While the foregoing invention has been described in some detail for purposes of clarity and understanding, it will be appreciated by one skilled in the art, from a reading of the disclosure, that various changes and modifications in form and detail can be made without departing from the true scope of the invention defined in the appended claims.

What is claimed is:

1. A method for protecting a touch screen of a hand held electronic device having a front face that includes a touch screen having a touch screen portion and a non-functional outer perimeter, which method comprises:

providing a touch screen protector comprising a film having front and back sides, an outer perimeter that essentially corresponds to the outer perimeter of the touch screen of the front face of the device, and a transparent window that essentially corresponds in size to that of the touch screen portion; micro-particles present on the back side of the film at a density which prevents visible interference patterns and provides an anti-static effect between the film and touch screen portion without adversely affecting quality of images viewed through the transparent window when the transparent window is pressed by the user's finger(s) against the touch screen portion of the electronic device during operation; a spacer provided on the back side of the film along the outer perimeter thereof and substantially continuously surrounding the transparent window to prevent trapping dust between the window and touch screen, with the spacer having a thickness sufficient to space the film near but not in contact with the touch screen; an exposed adhesive on one side of the spacer that faces the touch screen, with the exposed adhesive having sufficient adhesiveness to mount the touch screen protector onto the touch screen and to enable its removal without leaving adhesive residue on the touch screen; and a joining adhesive for adhering the spacer to the back side of the film, wherein the joining adhesive has an adhesive strength that is stronger than that of the exposed adhesive so that the spacer is not removed from the film when the protector is removed from the front face of the device; and removably attaching the touch screen protector upon the touch screen of the device via the exposed adhesive to form a space between the transparent window of the film, the spacer and the touch screen portion of the device, wherein the touch screen protector is attached without causing bubble formation or static cling between the transparent window of the film and the touch screen portion of the device;

wherein the transparent window can be pressed against the touch screen portion of the device for operation of the device while preventing direct contact of a user's fingers with the touch screen portion of the device and without generating static cling between the film and touch screen portion or producing visible interference patterns during use.

2. The method of claim 1, wherein the film has a thickness of between 0.5 and 2 mm and includes an opaque band about its periphery that receives the spacer.

3. The method of claim 1, wherein the film also includes micro-particles adhered to the front side of the window in an amount effective for providing anti-glare and anti-static effects to the front side of the window.

4. The method of claim 1, wherein the front face of the device has a non-functional band about its perimeter and the width of the spacer is selected to conform to or be within the band so that the spacer does not interfere with the use of the touch screen portion when the touch screen protector is adhesively mounted onto the device.

5. The method of claim 1, which further comprises providing a backing member to protect the back side of the film and the exposed adhesive prior to use.

6. The method of claim 5, wherein the backing member further includes a tab to assist in the removal of the backing member when mounting the touch screen protector on the device.

7. The method of claim 1, which further comprises providing one or more alignment holes that match one or more buttons on the electronic device to facilitate mounting of the touch screen protector on the device.

8. The method of claim 1, wherein the touch screen of the device and the film are each substantially rectangular and the touch screen is part of a telephone, reading device, music device, viewing device or navigation device.

9. The method of claim 1, wherein the transparent window is clear but includes a coating that provides a matte effect or a privacy screen feature.

10. The method of claim 1, wherein the film is a plastic film.

11. The method of claim 10, wherein the plastic film has a thickness of between 0.15 and 2 mm.

12. The method of claim 1, wherein the space formed between the transparent window of the film, the spacer and the touch screen portion of the device is an enclosed space.

13. The touch screen protector of claim 1, wherein the micro-particles are transparent and cover more than 5% up to 50% of the back side of the film.

14. In a hand held, touch screen electronic device having a front face that includes a touch screen having a touch screen portion and an outer perimeter that is non-functional, the improvement which comprises providing a touch screen protector for the device according to the method of claim 1.

15. The hand held, touch screen electronic device of claim 14, wherein the film is a plastic film.

16. The hand held, touch screen electronic device of claim 15, wherein the plastic film has a thickness of between 0.15 and 2 mm.

17. The hand held, touch screen electronic device of claim 14, wherein the space formed between the transparent window of the film, the spacer and the touch screen portion of the device is an enclosed space.

18. A method for protecting a touch screen of a hand held electronic device having a front face that includes a touch screen having a touch screen portion and a non-functional outer perimeter, which method comprises:

providing a touch screen protector comprising a film having front and back sides, an outer perimeter that essentially corresponds to the outer perimeter of the touch screen of the front face of the device, and a transparent window that essentially corresponds in size to that of the touch screen portion; micro-particles present on the back side of the film at a density which prevents visible interference patterns and provides an anti-static effect between the film and touch screen portion without adversely affecting quality of images viewed through the transparent window when the transparent window is pressed by the user's finger(s) against the touch screen portion of the electronic device during operation; and a spacer adhered to the back side of the film upon at least a portion of the outer perimeter of the film substantially continuously surrounding the transparent window to prevent trapping dust between the window and touch screen, the spacer having a thickness sufficient to space the film near but not in contact with the touch screen portion, with an exposed adhesive on one side of the spacer that faces the touch screen to mount the touch screen protector onto the touch screen and to enable its removal without leaving adhesive residue on the touch screen, and a joining adhesive on the other side of the spacer for adhering the spacer to the back side of the film, with the joining adhesive having an adhesive strength that is stronger than that of the exposed adhesive so that the spacer is not removed from the film when the protector is removed from the touch screen of the front face of the device; and removably attaching the touch screen protector upon the outer perimeter of the front face of the device via the exposed adhesive to form a space between the transparent window of the film, the spacer and the touch screen portion of the device, wherein the touch screen protector is attached without causing bubble formation between the transparent window of the film and the touch screen portion of the device;

wherein the transparent window can be pressed against the touch screen portion of the device for operation of the device while preventing direct contact of a user's fingers with the touch screen portion of the device and without producing static cling or visible interference patterns between the transparent window of the film and the touch screen portion of the device during use.

19. The method of claim 18, wherein the film is a plastic film, the touch screen of the device and the film are each substantially rectangular, and the spacer is provided at least upon the top and bottom portions of the outer perimeter of the film.

20. The touch screen protector of claim 18, wherein the micro-particles are transparent and cover more than 5% and 50% of the back side of the film.

21. A method for protecting a touch screen of a hand held electronic device having a front face that includes a touch screen having a touch screen portion and a non-functional outer perimeter, which method comprises:

removably attaching a touch screen protector to the touch screen of the hand held electronic device, the touch screen comprising a film having front and back sides, an outer perimeter that essentially corresponds to the outer perimeter of the touch screen of the front face of the device, and a transparent window that essentially corresponds in size to that of the touch screen portion;

micro-particles present on the back side of the film at a density which prevents visible interference patterns and provides an anti-static effect between the film and touch screen portion without adversely affecting quality of images viewed through the transparent window when the transparent window is pressed by the user's finger(s) against the touch screen portion of the electronic device during operation;

a spacer provided on the back side of the film along the outer perimeter thereof and substantially continuously surrounding the transparent window, with the spacer having a thickness sufficient to space the film near but not in contact with the touch screen and form a space between the transparent window of the film, the spacer and the touch screen portion of the device;

an exposed adhesive on one side of the spacer that faces the touch screen, with the exposed adhesive having sufficient adhesiveness to mount the touch screen protector onto the touch screen and to enable its removal without leaving adhesive residue on the touch screen; and a joining adhesive for adhering the spacer to the back side of the film, wherein the joining adhesive has an adhesive strength that is stronger than that of the exposed adhesive so that the spacer is not removed from the film when the protector is removed from the front face of the device;

wherein the touch screen protector is attached without causing bubble formation or static cling between the transparent window of the film and the touch screen portion of the device, wherein the transparent window can be pressed against the touch screen portion of the device for operation of the device while preventing direct contact of a user's fingers with the touch screen portion of the device and without generating static cling between the film and touch screen portion or producing visible interference patterns during use.

* * * * *